Patented Feb. 12, 1946

2,394,532

UNITED STATES PATENT OFFICE 2,394,532

HAND COVERING

Joseph Shmikler, Champaign, Ill., assignor to Illinois Glove Company, Champaign, Ill., a partnership of Illinois, comprising Samuel Shmikler, Joseph Shimkler, and Ray Shmikler, all of Champaign, Ill.

No Drawing. Application January 10, 1945, Serial No. 572,263

3 Claims. (Cl. 2—159)

This invention relates to an improved hand covering and the like comprising a plastic material. In a preferred embodiment, a plastic material is used as a bond for the seams.

This invention involves construction of all sorts of hand coverings including gloves, mittens, finger stalls, palm coverings, and the like.

My invention contemplates the use of both thermoplastic and thermosetting materials, although the two are not to be considered equivalent since they may be used for different types of hand-covering articles. I do not mean to include rubber or similar materials, nor cements and glues, and the like.

Some of the thermoplastic materials which I prefer to use because of their rapid bonding on heating include: rubber hydrochloride, vinyl resin, plasticized polyvinyl chloride, vinylidene chloride, and various cellulose derivatives such as cellulose nitrate. However, it is also within the scope of my invention to use the following thermoplastic materials: polyvinyl acetal, casein and its derivatives, cellulose acetate, polystyrene, polyvinyl acetal, ethyl cellulose, polyvinyl formal, methol methacrylate resin, polyvinyl butyrals, cellulose acetate butyrate, and vinyl chloride-acetate copolymer, etc.

Among my preferred thermosetting materials are vinyl resin formaldehyde, polyvinyl acetate emulsions, and phenol formaldehyde resins. However, I may use any one of the following thermosetting materials: urea formaldehyde, melamine formaldehyde, phenolic furfural, etc. It is within the scope of my invention to use the above plastic materials either alone or in admixture.

It is also within the scope of my invention to use certain plasticizers with any of the above materials such as dibutyl phthalate, tributyl phosphate, toluene sulfonamide, tricresyl phosphate, methoxyethyl phthalate, and others. Also, when it is desired to apply a coating of the plastic on the material to be bonded, various solvents may be used, such as toluol, alcohols, acetates, and the like.

Thermosetting materials form a bond with other materials upon heating in the presence of a high frequency current, but thermoplastic materials after the heating step must be allowed to cool to fix the bond.

My invention contemplates the manufacture of an improved hand covering made of the usual materials for hand coverings, but instead of stitching or cementing the seams, I use either a thermoplastic or a thermosetting material which forms a bond upon heating. For example, in the making of a leather glove, I may use a plastic material in the seam between the leather sections which, upon heating, forms a bond. It is also useful in bonding together all types of fabrics, as well as leather materials.

There are many advantages in the use of a thermoplastic or thermosetting material for bonding the seams of hand covering articles such as gloves. The use of such a bonding edge permits a less bulky seam and the bond may be made between the various sections of the glove so that it does not need to be turned after the seam is bonded. It is the present practice in making gloves and similar articles that the seam is stitched inside out, and the glove must be turned, which is an expensive and time-consuming operation. By the use of plastic, a seam is obtained which is as strong or stronger than the glove material which obviates the use of reenforcement along the seam. Such reenforcements are frequently applied along the seams of the gloves of the Gunn-cut type which are to be used in heavy-duty work. Furthermore, the seams are not nearly as bulky and there is more flexibility as to the positioning of the seams. At the present time, the seams of gloves which are used either in heavy-duty work or in work where the gloves must protect the hands from high temperatures, the seams must be placed where they will not be exposed to excessive wear or excessive heat. This often causes a waste in the blank material, since the glove blanks can not be cut in the most economical manner. By use of a plastic bond at the seam instead of stitching or cementing not only is a stronger bond obtained, but there is more flexibility in the placing of the seams.

By the use of a plastic bonding agent in the seams, an advantage is obtained over stitching since the glove covering material is not repeatedly punctured by the fabricating needle, which tends to weaken the glove at the seam. Moreover, such repeated puncturing in many instances causes a distortion of the glove and causes an unsightly wrinkling effect at the seam. Also, by the use of my bonding agent, the glove is just as impervious to liquids, gases, and other foreign substances at the seam as is any part of the rest of the glove, which is not the case where stitching is used.

My invention does not contemplate the use of ordinary cements or glues in which the bonding is obtained on heating primarily by a drying action or chemical or crystalline changes at atmospheric conditions. In using either thermoplastic or thermosetting material, the bonding on heating is not obtained by a drying action but probably is obtained by either a physical or chemical rearrangement of the bonding material. This does not mean that it is not desirable in many cases to incorporate the plastic in a solvent or a binding material which disappears upon heating, but the bond is not one obtained purely by evaporation of a solvent. Rather, the solvent or binder serves as a carrier to conveniently apply the plastic to the surfaces. Bonding is still obtained by heating.

The use of thermoplastic or thermosetting materials has many advantages over cements, glues, and the like. Many of the cements and glues require pressure and clamping apparatus for maintaining the article in position until the glue or cement sets. It is the nature of thermoplastic materials and thermosetting materials that the bond is rapidly formed and therefore is more practical to use in the manufacture of gloves, especially since the profit per glove is small and the total profit depends on a large production. It is for this reason that even with the most quick-setting glues or cements, the time required and the investment for the clamping and pressuring apparatus has made such a process uneconomical.

In my preferred operation, I feed the thermoplastic material into the seam in the form of a welt, using any of the standard methods heretofore employed, and then pass the seam in a high frequency field between two electrodes whereby the seam is bonded by the plastic by induction or dielectric heating and not by directly applied heating. In other words, a high frequency current, which causes the heating, is passed through the material and plastic to bring about the bonding. This permits the use of machines for obtaining the welding of thermoplastic materials by a high frequency field wherein the seam is mechanically drawn through electrode work wheels, and the feeding operation of the machine is similar to present-type stitching or sewing machines. I may also use mandrels for positioning the glove and for providing the electrodes required for the high frequency field.

It may be desirable to precoat the section of the material along the seam with thermoplastic material, in which case it is dissolved in a solvent and the material first placed along the seam and allowed to cure or dry. After it is dried, it is passed through a high frequency field and welded in the usual manner. However, I prefer to use a thermoplastic adhesive such as cellulose nitrate which does require a high temperature to soften and which does not change its composition during the heat treatment, and which eliminates the so-called curing step. Such a thermoplastic material requires a temperature range from 130° to 200° C. to form a proper bond. In general, for most of the plastics, the temperature required for proper bonding varies from about 100° to about 250° C. As a rule, high pressures are not required to effect the bond, but moderate pressures of 2 to 25 pounds per square inch may be used with beneficial results. Enough pressure should be applied and in such a manner as to insure the formation of uniform seams well-bonded.

In some glove constructions, it is desirable to use thermosetting materials rather than thermoplastic materials, although in general, thermosetting materials do not permit as rapid construction as do thermoplastic materials. Thermosetting materials are preferable, especially in the manufacture of welder's gloves, and the like manufactured from heat resisting materials and which are subjected to intense heat, since they do not tend to soften but rather tend to harden upon heating. In making a glove in this manner, it is preferable to coat the seam edge with a thermosetting material having a consistency of a paste and then passing the seam between two electrodes wherein the heating is obtained by induction. However, I may mix the thermosetting material with a suitable binder or may extrude it and insert it in the seam prior to the heating in a manner similar to feeding welt to a seam, which is a well-known method in ordinary stitching procedures.

I prefer to use induction heating because it does not involve the handling of a hot apparatus as is necessary in directly applied heating and permits a better control by the operator of the heating during bonding which is necessary in forming sharp curves required on the fabrication of gloves, and the like. Furthermore, such heating is practically instantaneous. In addition, induction heating heats the material uniformly through the seam and does not subject the glove material to a higher temperature than the plastic bond. I also find that a better result is obtained by induction heating than is obtained by applied heating which may be due to a different arrangement, either physical or chemical, of the plastic material, although the exact explanation is not known. The frequency of the current used to form the bond by induction heating may vary from several hundred-thousand to several hundred-million cycles per second, depending on the material to be bonded, and the type of plastic adhesive used.

I claim as my invention:

1. A hand covering comprising two or more preformed hand covering sections of non-plastic material, said preformed sections having their marginal edges joined, a heat responsive plastic water impervious bonding agent disposed between and constituting the sole bonding means for said marginal edges, said marginal edges being free from stitching extending therethrough.

2. A hand covering comprising two or more preformed hand covering sections of non-plastic material, said preformed sections having their marginal edges joined, a thermo-setting plastic water impervious bonding agent disposed between and constituting the sole bonding means for said marginal edges, said marginal edges being free from stitching extending therethrough.

3. A hand covering comprising two or more preformed hand covering sections of non-plastic material, said preformed sections having their marginal edges joined, a thermo-plastic water impervious bonding agent disposed between and constituting the sole bonding means for said marginal edges, said marginal edges being free from stitching extending therethrough.

JOSEPH SHMIKLER.